United States Patent
Kinoshita et al.

(10) Patent No.: US 8,872,639 B2
(45) Date of Patent: Oct. 28, 2014

(54) IN-VEHICLE SYSTEM

(75) Inventors: Kosuke Kinoshita, Iwaki (JP); Shinji Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 257 days.

(21) Appl. No.: 13/474,229

(22) Filed: May 17, 2012

(65) Prior Publication Data

US 2013/0009759 A1 Jan. 10, 2013

(30) Foreign Application Priority Data

Jul. 8, 2011 (JP) ................. 2011-151599

(51) Int. Cl.
- *H04B 3/58* (2006.01)
- *B60Q 1/00* (2006.01)
- *G06F 3/01* (2006.01)
- *B60K 35/00* (2006.01)
- *G02B 27/01* (2006.01)
- *G06F 3/0481* (2013.01)

(52) U.S. Cl.
CPC ............. *G06F 3/013* (2013.01); *B60K 35/00* (2013.01); *G02B 27/01* (2013.01); *G06F 3/0481* (2013.01); *G02B 2027/014* (2013.01); *G02B 2027/0187* (2013.01); *B60K 2350/1068* (2013.01); *B60K 2350/2052* (2013.01); *B60K 2350/352* (2013.01); *B60K 2350/906* (2013.01)
USPC ........................................ 340/425.5; 340/461

(58) Field of Classification Search
None
See application file for complete search history.

(56) References Cited

U.S. PATENT DOCUMENTS

| | | | | |
|---|---|---|---|---|
| 6,806,848 | B2 * | 10/2004 | Hirao et al. | 345/3.4 |
| 8,594,974 | B2 * | 11/2013 | Kumon et al. | 702/152 |
| 2007/0219709 | A1 | 9/2007 | Ikeda | |
| 2009/0027332 | A1 | 1/2009 | Cieler et al. | |
| 2010/0088015 | A1 | 4/2010 | Lee | |
| 2010/0121645 | A1 | 5/2010 | Seitz et al. | |
| 2011/0074657 | A1 | 3/2011 | Sugiyama | |
| 2011/0128139 | A1 | 6/2011 | Tauchi et al. | |
| 2012/0218295 | A1 | 8/2012 | Hashikawa et al. | |
| 2013/0096820 | A1 * | 4/2013 | Agnew | 701/428 |

FOREIGN PATENT DOCUMENTS

| | | |
|---|---|---|
| DE | 10349673 | 5/2005 |
| JP | 2001-307298 | 11/2001 |
| JP | 2007-093284 | 4/2007 |
| JP | 2011-070074 | 4/2011 |
| WO | 2011/055699 | 5/2011 |

OTHER PUBLICATIONS

Extended European Search Report for Application No. 12158638.2 dated Jul. 14, 2014, 12 pgs.

* cited by examiner

*Primary Examiner* — Julie Lieu
(74) *Attorney, Agent, or Firm* — Brinks Gilson & Lione

(57) ABSTRACT

An in-vehicle system includes a instrument cluster display arranged in an instrument cluster and a heads-up display that projects an image in an area on a front window above the instrument cluster. When a user continues viewing a display screen of the instrument cluster display for a predetermined period of time or longer, the display of the instrument cluster display is stopped, and content displayed on the display of the instrument cluster display is displayed on the heads-up display.

20 Claims, 6 Drawing Sheets

FIG. 2A1
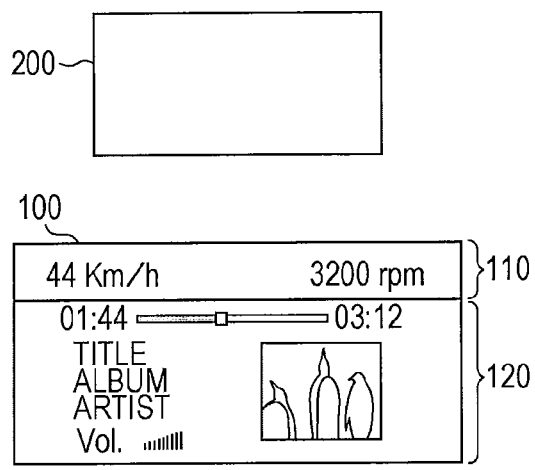
FIG. 2A2
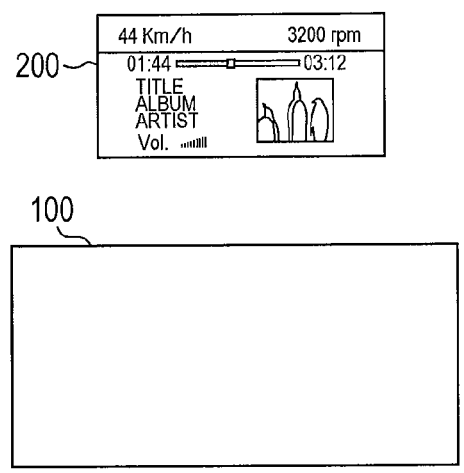
FIG. 2B1
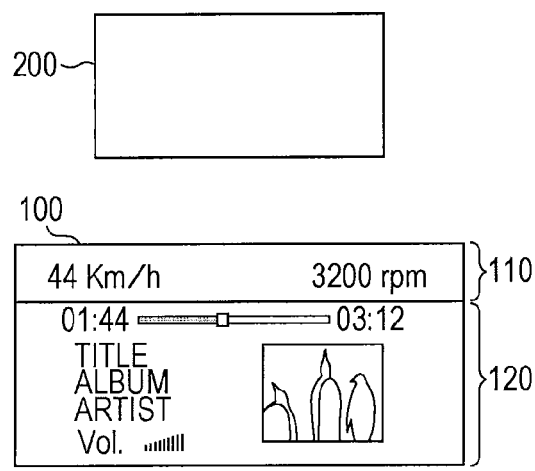
FIG. 2B2
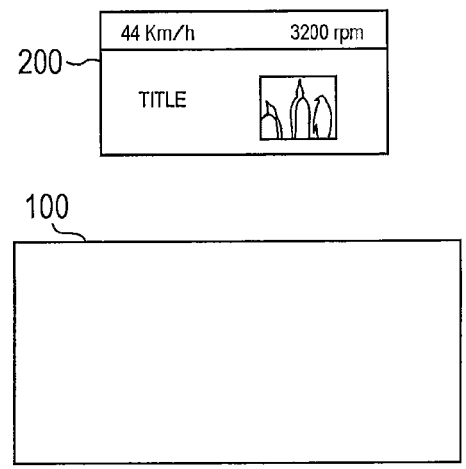

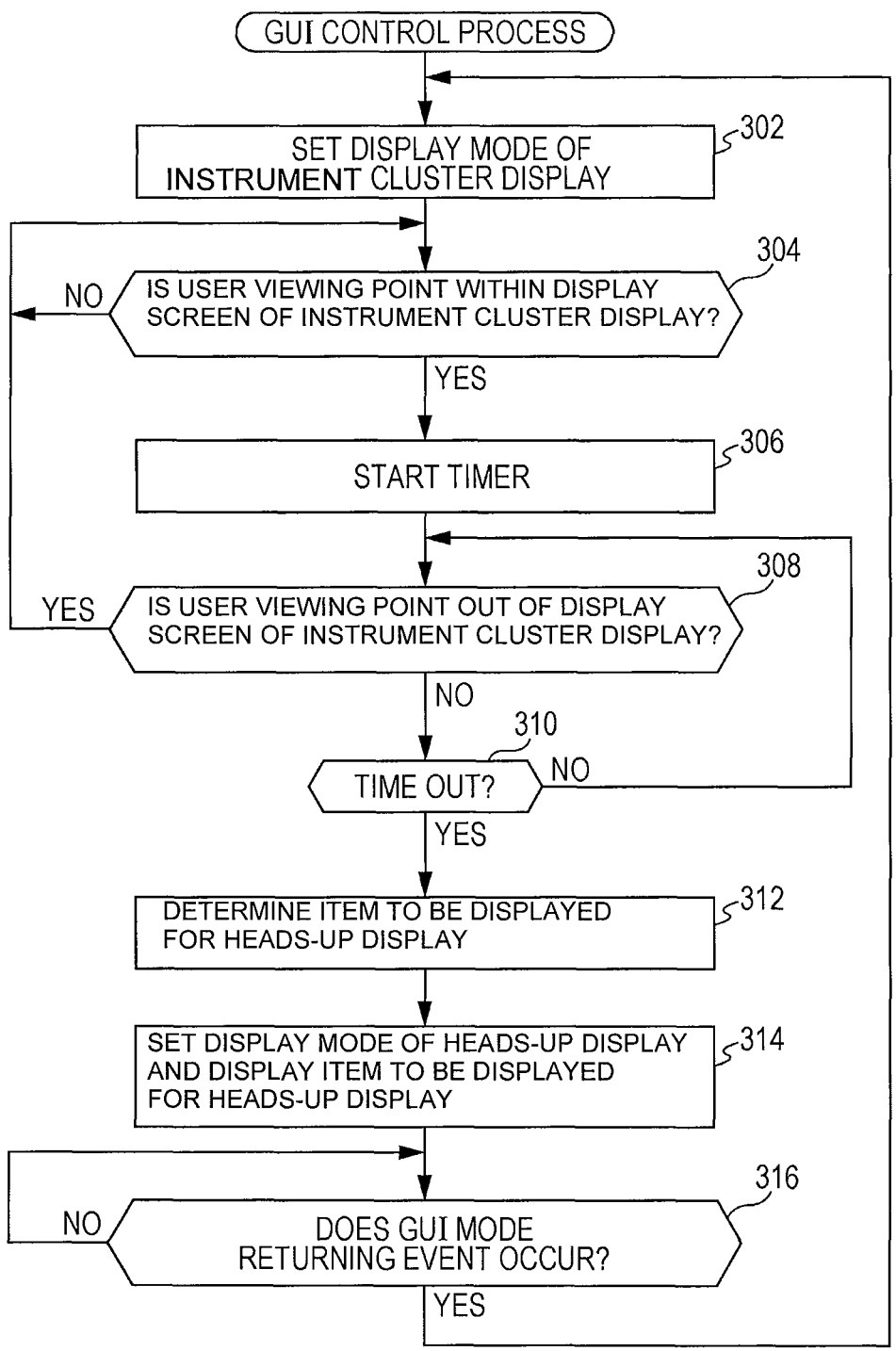

FIG. 4A1
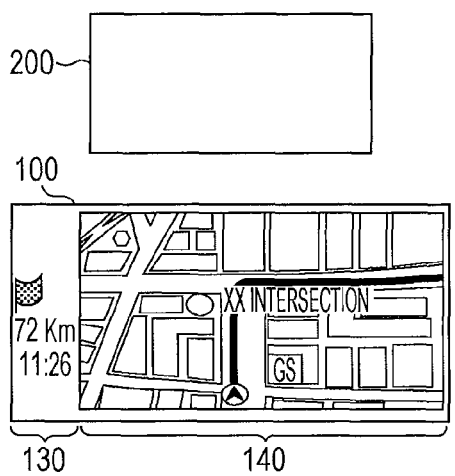
FIG. 4A2
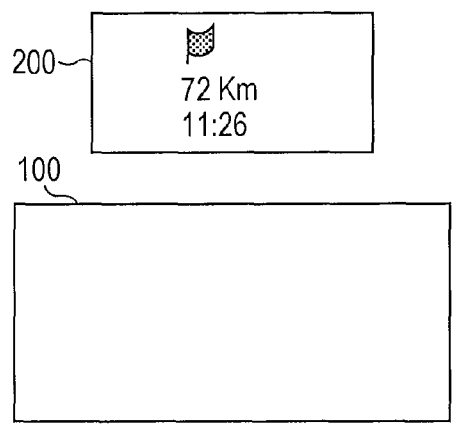
FIG. 4A3
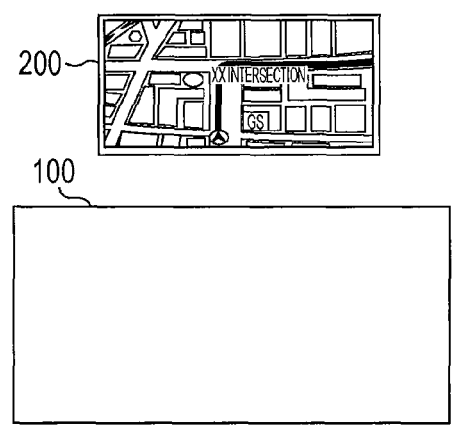
FIG. 4B1
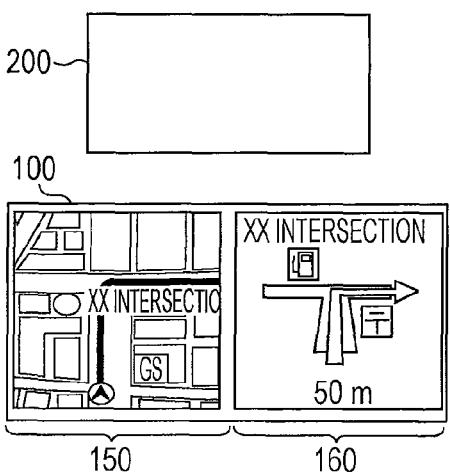
FIG. 4B2
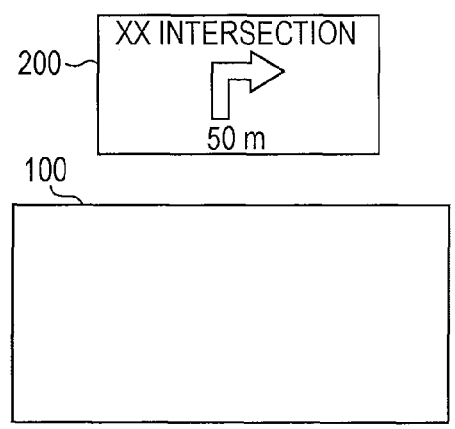

FIG. 5A1
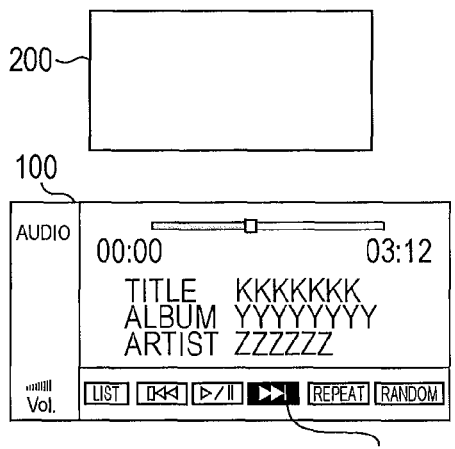
FIG. 5A2
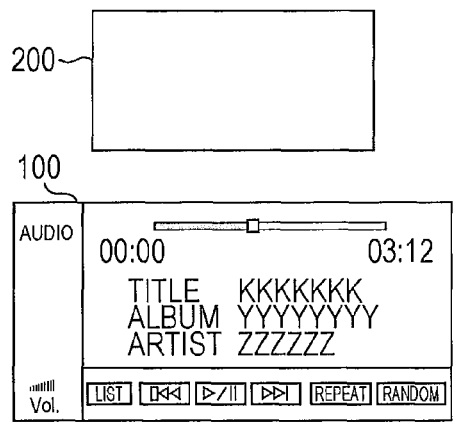
FIG. 5A3
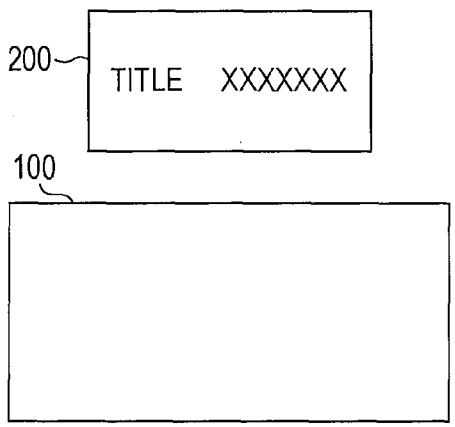
FIG. 5A4
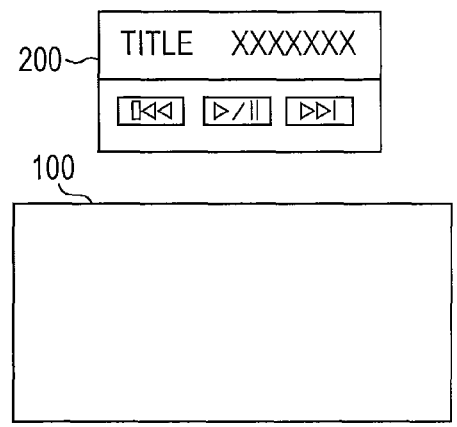
FIG. 5B1
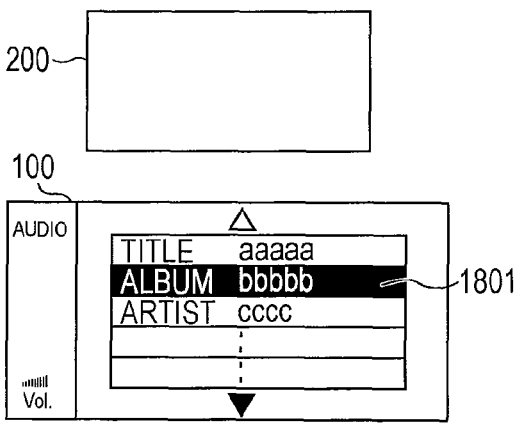
FIG. 5B2
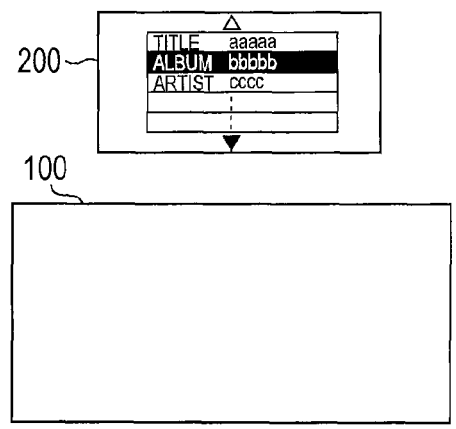

IN-VEHICLE SYSTEM

RELATED APPLICATION

The present application claims priority to Japanese Patent Application Number 2011-151599, filed Jul. 8, 2011, the entirety of which is hereby incorporated by reference.

BACKGROUND OF THE INVENTION

1. Field of the Invention

The present invention relates to a technology for restricting the viewing of a display which interrupts driving by a user in an in-vehicle system provided with the display.

2. Description of the Related Art

In an in-vehicle system provided with a display, a technology is known for detecting the viewing direction of a user and stopping a display if the user continues viewing the display for a predetermined period of time. This technology prevents viewing for a long period of time on the display which interrupts the driving by the user (for example, Japanese Patent No. 3614346).

Also, a display arranged in an instrument cluster (for example, Japanese Unexamined Patent Application Publication No. 2007-093284) and a heads-up display where an image is displayed on a front windshield have been described as the display installed in an automobile (for example, Japanese Unexamined Patent Application Publication No. 2011-070074).

According to the above-mentioned technology for stopping the display if the user continues viewing the display for a predetermined period of time, a disruption in driving caused by viewing the display can be suppressed. However, after the user continues viewing the display for the predetermined period of time, information presented to the user by using the display is disabled, and the convenience of the user is impaired.

SUMMARY

In view of the above, according to one aspect of embodiments of the present invention, there is provided an in-vehicle system with which information presentation to a user can be carried out continuously in a manner that viewing a display does not disturb driving.

According to one embodiment, there is provided an in-vehicle system mounted in an automobile, the in-vehicle system including: a first display arranged on a dashboard panel; a second display configured to display an image through a projection on a front window toward a driver's position; a viewing point detection unit configured to detect a viewing point of a driver of the automobile; and a user interface control unit configured to display a user interface on the first display. While the automobile is in motion, if the period of time in which the viewing point of the driver which is detected by the viewing point detection unit is located at a position on a display screen of the first display continues for a predetermined period of time when the user interface is displayed on the first display, the user interface control unit stops the display on the first display and starts to display a user interface on the second display instead of on the first display.

According to the above-mentioned in-vehicle system, in a case where the driver continues viewing the first display arranged on the dashboard panel for a predetermined period of time, the display on the first display is stopped, and it is possible to prevent the user from being disturbed in driving because of viewing the first display for a long period of time.

On the other hand, when the display on the first display is stopped, the interface is displayed with the second display by displaying the image through a projection on the front window toward the driver's position. At this time, the image generally is displayed in a translucent manner in the front window direction as seen by the driver, and thus, this configuration does not significantly disrupt the driver's check of the surrounding area to the front side of the automobile.

Therefore, the information presentation to the user can be carried out continuously in a manner that viewing the display does not become a disturbance to driving.

In the above-mentioned in-vehicle system, when the user interface using the display on the second display is started, the user interface control unit may be configured to display, on the second display, a display screen identical to a display screen displayed on the first display before the display on the first display is stopped.

Alternatively, in the above-mentioned in-vehicle system, when the user interface using the display on the second display is started, the user interface control unit may be configured to display, on the second display, information displayed on the first display before the display on the first display is stopped in a mode different from a mode for the display of the information on the first display.

Alternatively, in the above-mentioned in-vehicle system, when the user interface using the display on the second display is started, the user interface control unit may be configured to display, on the second display, only a part of the contents displayed on the first display before the display on the first display is stopped.

Alternatively, when the user interface using the display on the second display is started, the user interface control unit may be configured to display information, displayed in a first display mode on the first display before the display on the first display is stopped, on the second display in a second display mode that is simplified from the first display mode.

Alternatively, when the user interface using the display on the second display is started, the user interface control unit may be configured to display, on the second display, contents displayed at a position within the display screen of the first display where the viewing point of the driver is located immediately before the display on the first display is stopped.

Alternatively, when the user interface using the display on the second display is started, the user interface control unit may be configured to display, on the second display, information whose content is last changed among information displayed on the first display before the display on the first display is stopped.

Alternatively, the in-vehicle system further includes an input apparatus configured to accept operations by the driver on display objects displayed on the first display and display objects displayed on the second display, and when the user interface using the display on the second display is started, the user interface control unit may be configured to display, on the second display, a display object for which the acceptance of an operation was last carried out by the input apparatus before the display on the first display is stopped.

Alternatively, the in-vehicle system further includes an input apparatus configured to accept operations by the driver on display objects displayed on the first display and display objects displayed on the second display, and when the user interface using the display on the second display is started, the user interface control unit may be configured to display, on the second display, a display object for which the acceptance of an operation is carried out by the input apparatus from among the display objects displayed on the first display before the display on the first display is stopped.

According to the above-mentioned configuration, at the time of the start of providing the interface using the display on the second display, only the contents including the display objects where the probability that the driver at the moment is viewing is high among the contents displayed thus far on the first display may be displayed on the second display, and the convenience of the user can be ensured. Also, by narrowing down the display contents of the second display in this manner, even if the second display has a display quality lower than the first display, the visibility of the display contents can be satisfactorily maintained.

Also, in the above-mentioned in-vehicle systems, when the user interface using the display on the first display is provided while the automobile is in motion, if the period of time for which the viewing point of the driver which is detected by the viewing point detection unit at a position on the display screen of the first display continues for a predetermined period of time, the user interface control unit may be configured to perform a display on the first display for urging a utilization of the second display instead of stopping the display on the first display.

In the above-mentioned in-vehicle systems, the user interface may be a user interface of an AV apparatus or navigation apparatus mounted in the automobile, and when the user interface using the display on the first display is provided while the automobile is in motion, if the period of time for which the viewing point of the driver which is detected by the viewing point detection unit at a position on the display screen of the first display continues for a predetermined period of time, the user interface control unit may be configured to switch the display on the first display to a display of information related to a state of the automobile instead of stopping the display on the first display.

In the above-mentioned in-vehicle systems, when the user interface using the display on the first display is provided while the automobile is in motion, if the period of time for which the viewing point of the driver which is detected by the viewing point detection unit at a position on the display screen of the first display continues for a predetermined period of time, the user interface control unit may be configured to display an animation on the second display in which a display content of the first display moves in a direction toward an image display position of the second display and stop the display on the first display.

In the above-mentioned in-vehicle systems, the first display may be arranged in an instrument cluster of the automobile.

As described above, it is possible to provide an in-vehicle system for which an information presentation to the user can be carried out continuously in a manner that viewing the display does not disturb the driving.

BRIEF DESCRIPTION OF THE DRAWINGS

FIGS. 2A1, 2A2, 2B1, and 2B2 illustrate display examples of the in-vehicle system according to the embodiment of the present invention;

FIG. 3 is a flow chart of a GUI control process according to the embodiment of the present invention;

FIGS. 4A1, 4A2, 4A3, 4B1, and 4B2 illustrate display examples of the in-vehicle system according to the embodiment of the present invention;

FIGS. 5A1, 5A2, 5A3, 5A4, 5B1, and 5B2 illustrate display examples of the in-vehicle system according to the embodiment of the present invention.

DESCRIPTION OF THE PREFERRED EMBODIMENTS

Hereinafter, exemplary embodiments of the present invention will be described.

Figure 1A:
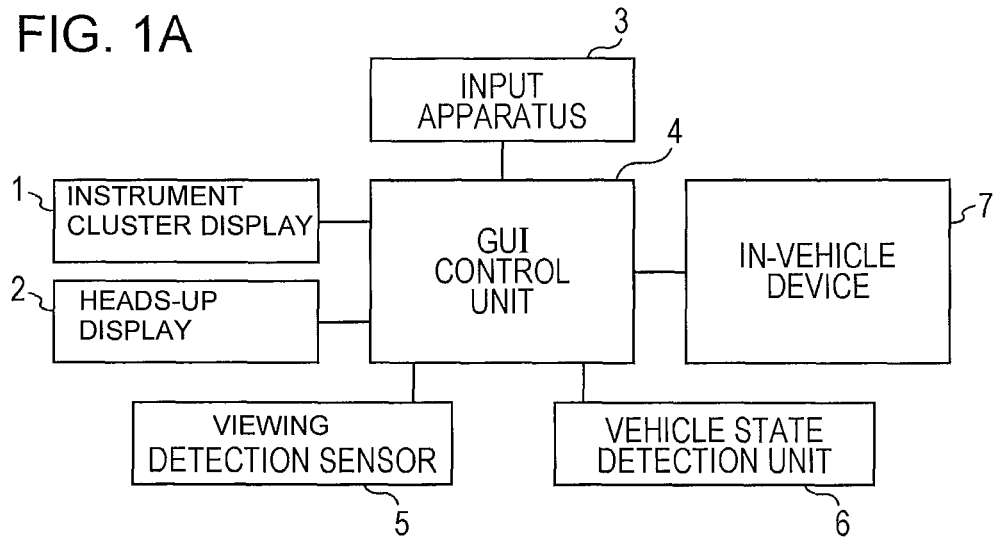
FIG. 1A is a block diagram illustrating a configuration of an in-vehicle system according to an embodiment of the present invention.

FIG. 1A illustrates a configuration of an in-vehicle system according to the present exemplary embodiment.

The in-vehicle system is a system installed in an automobile and may include, as illustrated in FIG. 1A, an instrument cluster display 1, a heads-up display 2, an input apparatus 3, a GUI control unit 4, a viewing detection sensor 5, a vehicle state detection unit 6, and an in-vehicle device 7.

The vehicle state detection unit 6 detects a vehicle state such as a driving/stopping state and a steering state of the automobile. It should be noted that the vehicle state detection unit 6 may be configured to obtain the vehicle state from an ECU of the automobile.

Figure 1B:
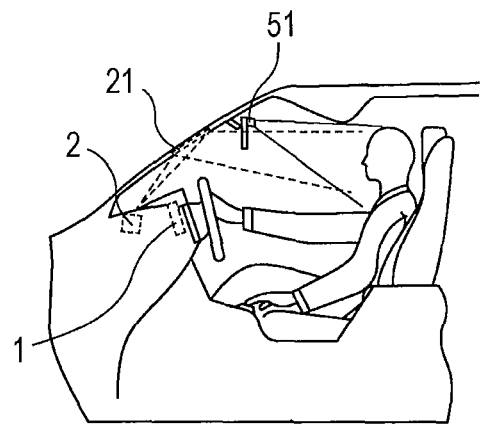
FIGS. 1B and 1C illustrate examples of displays.
Figure 1C:
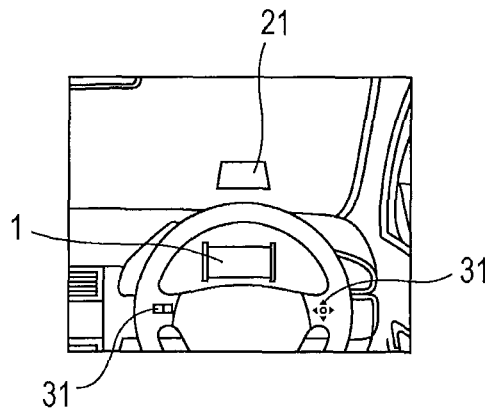

In addition, as illustrated in FIGS. 1B and 1C, the instrument cluster display 1 is a display arranged in an instrument cluster of the dashboard panel (instrument panel), and the heads-up display 2 is a display that projects an image onto an area 21 above the instrument cluster on a front window. Also, the input apparatus 3 is an apparatus that accepts a user operation by buttons 31 arranged on a steering wheel, and the viewing detection sensor 5 is a sensor that detects a viewing direction of the user by analyzing an image of a head region of the driver which is picked up by a camera 51.

Furthermore, the in-vehicle device 7 is a car accessory apparatus such as an AV apparatus or a navigation apparatus, and the GUI control unit 4 controls a GUI (Graphical User Interface) using the instrument cluster display 1, the heads-up display 2, and the input apparatus 3 of the in-vehicle device 7. The GUI control unit 4 may be configured by using a computer provided with peripheral devices such as a CPU and a memory, and in this case, the respective processes by the GUI control unit 4 are realized while a computer executes a predetermined computer program.

According to the present embodiment, a display mode for the instrument cluster display and a display mode for the heads-up display are provided as GUI modes that are modes for the GUI provided to the user.

A display screen of the instrument cluster display 1 is denoted by reference symbol 100, and a display screen of the heads-up display 2 is denoted by reference symbol 200. As illustrated in FIG. 2A1, the display mode for the instrument cluster display is the mode for providing the GUI using the display of the instrument cluster display 1 and the input apparatus 3 without the display of the heads-up display 2. As illustrated in FIG. 2A2, the display mode for the heads-up display is the mode for providing the GUI using the display of the heads-up display 2 and the input apparatus 3 without the display of the instrument cluster display 1.

Hereinafter, a GUI control process carried out by the GUI control unit 4 in the above-mentioned in-vehicle system during a period of time for which the driving state of the automobile is detected by the vehicle state detection unit 6 will be described. FIG. 3 illustrates a procedure of this GUI control process.

As illustrated in FIG. 3, in this process, first, the display mode for the instrument cluster display is set (step 302), and a user interface using the display of the instrument cluster display 1 and the input apparatus 3 is started. After that, the process stands by until a viewing point of the user calculated from the viewing direction of the user which is detected by the viewing detection sensor 5 is set at a position on the display screen of the instrument cluster display 1 (step 304).

When the viewing point of the user is set at a position on the display screen of the instrument cluster display 1, a timer having a predetermined time out period (for example, 1.5 seconds) is started (step 306). Then, an occurrence of the movement of viewing point of the user out of the display screen of the instrument cluster display 1 (step 308) and an occurrence of the time out by the timer (step 310) are monitored. If movement of the viewing point of the user out of the display screen of the instrument cluster display 1 occurs (step 308) before the time out occurs (step 310), the process returns to step 304, and the process stands by until the viewing point of the user is set at a position on the display screen of the instrument cluster display 1.

On the other hand, if the time out occurs (step 310) before movement of the viewing point of the user out of the display screen of the instrument cluster display 1 occurs (step 308), that is, the user continues viewing the instrument cluster display 1 for a period of time longer than or equal to the time out period, items to be displayed on the heads-up display are set (step 312). The items to be displayed on the heads-up display which are set at this time will be described below.

Then, the display mode for the heads-up display is set. The display of the instrument cluster display 1 is stopped. While the display of the set items to be displayed for the heads-up display is set as an initial display of the heads-up display 2, a user interface using the display of the heads-up display 2 and the input apparatus 3 is started (step 314).

After that, the process stands by until a predetermined GUI mode returning event occurs (step 316). When the GUI mode returning condition is satisfied, the process returns to step 302. The display mode for the instrument cluster display is set, and the processes in step 304 and subsequent steps are carried out in the above-mentioned manner.

As the GUI mode returning event used in step 316, a state can be used in which the viewing point of the user at a time when a predetermined period of time elapses since the setting of the display mode for the heads-up display (for example, 1 second) is at a position outside the heads-up display 2 and outside the display screen of the instrument cluster display 1. Also, a movement from a position on the display screen of the heads-up display 2 to a position outside the display screen of the heads-up display 2, and the like, can be used as the GUI mode returning event.

In the above, the GUI control process carried out by the GUI control unit 4 has been described. Hereinafter, process examples of the above-mentioned GUI control process will be illustrated with examples of the items to be displayed on the heads-up display which are set in step 312.

FIGS. 2A1 and 2A2 illustrate process examples of the GUI control process in a case where all the display contents of the instrument cluster display 1 at the time of the switching of the GUI mode to the display mode for the heads-up display are set as the items to be displayed on the heads-up display. In this case, in the display mode of the instrument cluster display as illustrated in FIG. 2A1, in a state in which the display of the heads-up display is stopped and a display screen 110 related to an automobile state (such as a vehicle speed and an engine speed) and a GUI screen 120 of the AV apparatus that is the in-vehicle device 7 are displayed on the instrument cluster display 1, when viewing by the user on the display screen of the instrument cluster display 1 for a predetermined period of time is detected, the GUI mode is switched to the display mode for the heads-up display.

When the GUI mode is switched to the display mode for the heads-up display, the display of the instrument cluster display 1 is stopped as illustrated in FIG. 2A2, and all the display contents of the instrument cluster display 1 illustrated in FIG. 2A1 which are set as the items to be displayed on the heads-up display at the time of switching to the display mode for the heads-up display are displayed on the heads-up display 2.

Next, FIGS. 2B1 and 2B2 illustrate process examples of the GUI control process in a case where a simplified content obtained by extracting, for example, a part of the display contents of the instrument cluster display 1 at time of the switching of the GUI mode to the display mode for the heads-up display is set as the items to be displayed on the heads-up display. In this case, in the display mode of the instrument cluster display as illustrated in FIG. 2B1, in a state in which the display of the heads-up display is stopped and the display screen 110 of the automobile state (such as the vehicle speed and the engine speed) and the GUI screen 120 of the AV apparatus that is the in-vehicle device 7 are displayed on the instrument cluster display 1, when viewing by the user on the display screen of the instrument cluster display 1 for a predetermined period of time is detected, the GUI mode is switched to the display mode for the heads-up display.

When the GUI mode is switched to the display mode for the heads-up display, as illustrated in FIG. 2B2, the display of the instrument cluster display 1 is stopped, and the contents obtained by simplifying the display contents of the instrument cluster display 1 illustrated in FIG. 2B1 which are set as the items to be displayed on the heads-up display at the time of switching to the display mode for the heads-up display are displayed on the heads-up display 2. FIG. 2B2 illustrates a case in which the display contents of the display screen 110 related to the state of the automobile and a title and art work (cover art) of a played music piece which are included in the GUI screen 120 of the AV apparatus among the display contents of the instrument cluster display 1 of FIG. 2B1 are set as the items to be displayed on the heads-up display at the time of switching to the display mode for the heads-up display.

It should be noted that in a case where the GUI control process is carried out as illustrated in FIGS. 2B1 and 2B2, for each display screen of the instrument cluster display 1, the part where a probability that the user is viewing is thought to be high in the relevant display screen is previously set as the part selected as the items to be displayed on the heads-up display in a case where switching to the display mode for the heads-up display is carried out when the relevant display screen is displayed. After that, while following the relevant setting, it is decided to select which item of the display contents of the instrument cluster display 1 as the items to be displayed on the heads-up display.

Next, FIGS. 4A1, 4A2, and 4A3 illustrate process examples of the GUI control process in a case where the part which the user is viewing among the display contents of the instrument cluster display 1 at the time of switching the GUI mode to the display mode for the heads-up display is set as the items to be displayed on the heads-up display. It should be noted that the part which the user is viewing among the display contents of the instrument cluster display 1 is determined on the basis of the viewing point of the user calculated from the viewing direction of the user which is detected by the viewing detection sensor 5.

In this case, in the display mode of the instrument cluster display as illustrated in FIG. 4A1, in which the display of the heads-up display is stopped and a destination information screen 130 representing a distance to a destination and a destination arrival estimated time of a navigation apparatus that is the in-vehicle device 7 and a guidance screen 140 representing a current position and a guidance route on a map are displayed on the instrument cluster display 1, when viewing by the user on the display screen of the instrument cluster display 1 is detected for a predetermined period of time, the GUI mode is switched to the display mode for the heads-up display.

When the GUI mode is switched to the display mode for the heads-up display, the display of the instrument cluster display 1 is stopped, and the contents representing the part which the user is viewing among the display contents of the instrument cluster display 1 illustrated in FIG. 4A1 are set as the items to be displayed on the heads-up display at the time of switching to the display mode for the heads-up display and are displayed on the heads-up display 2.

That is, where the user is viewing a position on the destination information screen 130 among the display contents of the instrument cluster display 1 illustrated in FIG. 4A1 before switching to the display mode for the heads-up display, for example, the destination information screen 130 among the display contents of the instrument cluster display 1 illustrated in FIG. 4A1 is set as the item to be displayed on the heads-up display, and after the switching to the display mode for the heads-up display as illustrated in FIG. 4A2, the contents of the destination information screen 130 are displayed on the heads-up display 2.

On the other hand, where the user is viewing a position on the guidance screen 140 among the display contents of the instrument cluster display 1 illustrated in FIG. 4A1 before the switching to the display mode for the heads-up display, for example, the guidance screen 140 among the display contents of the instrument cluster display 1 illustrated in FIG. 4A1 is set as the item to be displayed on the heads-up display, and after switching to the display mode for the heads-up display as illustrated in FIG. 4A3, the contents of the guidance screen 140 are displayed on the heads-up display 2.

Next, FIGS. 4B1 and 4B2 illustrate examples of the GUI control process in a case where a content obtained by simplifying the part which the user is viewing among the display contents of the heads-up display 2 at the time of switching of the GUI mode to the display mode for the heads-up display is set as the items to be displayed on the heads-up display. In this case, in the display mode of the instrument cluster display as illustrated in FIG. 4B1, in which the display of the heads-up display is stopped and a guidance screen 150 representing a current position and a guidance route on a map and an approaching intersection enlargement screen 160 representing a route at an intersection of the navigation apparatus that is the in-vehicle device 7 are displayed on the instrument cluster display 1, when viewing by the user on the display screen of the instrument cluster display 1 is detected for a predetermined period of time, the GUI mode is switched to the display mode for the heads-up display.

When the GUI mode is switched to the display mode for the heads-up display, the display of the instrument cluster display 1 is stopped, and the contents obtained by simplifying the part which the user is viewing among the display contents of the instrument cluster display 1 illustrated in FIG. 4B1 are set as the items to be displayed on the heads-up display at the time of switching to the display mode for the heads-up display and are displayed on the heads-up display 2. That is, when the user is viewing the intersection enlargement screen 160 among the display contents of the instrument cluster display 1 illustrated in FIG. 4B1 before switching to the display mode for the heads-up display, contents obtained by simplifying the contents of the intersection enlargement screen 160 are set as the items to be displayed on the heads-up display, and after switching to the display mode for the heads-up display as illustrated in FIG. 4B2, the contents obtained by simplifying the contents of the intersection enlargement screen 160 are displayed on the heads-up display 2.

It should be noted that in FIG. 4B2, by simplifying graphic parts representing the route and surrounding facilities on a graphic schematically representing an intersection outline in the intersection enlargement screen 160 illustrated in FIG. 4B1 into only an arrow representing a turning direction on the route, the contents of the intersection enlargement screen 160 illustrated in FIG. 4B1 are simplified.

Next, FIGS. 5A1, 5A2, 5A3, and 5A4 illustrate examples of the GUI control process in which a user operation carried out immediately before switching the GUI mode to the display mode for the heads-up display and the portion related to the change on the display contents of the instrument cluster display 1 are the items to be displayed on the heads-up display.

In this case, in the display mode of the instrument cluster display illustrated in FIG. 5A1, in which the display of the heads-up display is stopped and the GUI screen of an AV apparatus that is the in-vehicle device 7 is displayed on the instrument cluster display 1, after a user operation is carried out on a play skip button 1701 for skipping one track to be played and the GUI screen of the AV apparatus of the instrument cluster display 1 is changed as illustrated in FIG. 5A2, when viewing by the user on the display screen of the instrument cluster display 1 is detected for a predetermined period of time without a user operation or the change on the GUI screen, the GUI mode is switched to the display mode for the heads-up display.

When the GUI mode is switched to the display mode for the heads-up display, the display of the instrument cluster display 1 is stopped, and the contents related to the user operation carried out immediately before and the change on the display contents of the heads-up display 2 among the display contents of the instrument cluster display 1 illustrated in FIG. 5A2 which are set as the items to be displayed on the heads-up display at the time of switching to the display mode for the heads-up display are displayed on the heads-up display 2. For example, as illustrated in FIG. 5A3, a title of the playing track where the display content of the instrument cluster display 1 is changed immediately before from among the display contents of the instrument cluster display 1 illustrated in FIG. 5A2 is set as the item to be displayed on the heads-up display. After switching to the display mode for the heads-up display, the title of the playing track is displayed on the heads-up display 2.

Alternatively, as illustrated in FIG. 5A4, various buttons for play control similar to the play skip button 1701 operated immediately before by the user and the title of the playing track where the display content is changed through the operation on the play skip button 1701 carried out immediately before from among the display contents of the instrument cluster display 1 illustrated in FIG. 5A2 are set as the items to be displayed on the heads-up display. After switching to the display mode for the heads-up display, these contents are displayed on the heads-up display 2.

It should be noted that a setting on which contents among the display contents of the instrument cluster display 1 are set as the part related to the user operation and the change on the display contents of the heads-up display 2 (the part set as the items to be displayed on the heads-up display) is previously carried out for each of the display screen of the instrument cluster display 1, the user operation, and the change content on the display screen of the instrument cluster display 1.

Next, FIGS. 5B1 and 5B2 illustrate examples of the GUI control process in a case where the portion set as the user operation target at the time switching of the GUI mode to the display mode for the heads-up display among the display contents of the heads-up display 2 is set as the items to be displayed on the heads-up display.

In this case, in the display mode of the instrument cluster display as illustrated in FIG. 5B1, in which the display of the heads-up display is stopped while a track list 1801 is displayed on the GUI screen of the AV apparatus that is the in-vehicle device 7 and an operation on the track list 1801 is accepted on the instrument cluster display 1, when viewing by the user on the display screen of the instrument cluster display 1 is detected for a predetermined period of time, the GUI mode is switched to the display mode for the heads-up display.

When the GUI mode is switched to the display mode for the heads-up display, the display of the instrument cluster display 1 is stopped, and the portion set as the user operation target among the display contents of the instrument cluster display 1 illustrated in FIG. 5B1 is set as the items to be displayed on the heads-up display at the time of switching to the display mode for the heads-up display and is displayed on the heads-up display 2.

That is, for example, as illustrated in FIG. 5B2, among the display contents of the instrument cluster display 1 illustrated in FIG. 5B1, the part of the track list 1801 where the user operation is accepted at the time of switching to the display mode for the heads-up display is set as the item to be displayed on the heads-up display and displayed on the heads-up display 2 after switching to the display mode for the heads-up display.

In the above, at the time of switching to the display mode for the heads-up display as illustrated in FIG. 2B2, FIGS. 4A2, 4A3, and 4B2, and FIGS. 5A3, 5A4, and 5B2, the contents to be displayed on the heads-up display 2 are obtained by narrowing down the contents already displayed on the instrument cluster display 1 to only a part of the contents. Therefore, the display can be carried out while a satisfactory visibility is also maintained on the heads-up display 2 which is in general low in display quality as compared with the instrument cluster display 1. Also, at the time of switching to the display mode for the heads-up display as illustrated in FIG. 2B2, FIGS. 4A2, 4A3, and 4B2, and FIGS. 5A3, 5A4, and 5B2, by selecting the content to be displayed on the heads-up display 2, the part where the probability that the user is viewing is thought to be high among the contents already displayed on the instrument cluster display 1 is displayed on the heads-up display 2, for the convenience of the user.

In the above, examples of the GUI control process carried out by the GUI control unit 4 have been described.

Figure 6A:
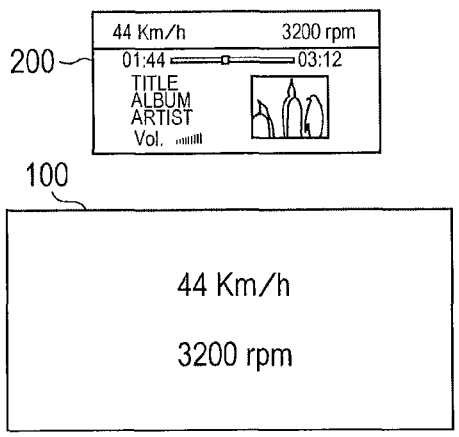
FIGS. 6A, 6B, 6C, and 6D illustrate display examples of the in-vehicle system according to the embodiment of the present invention.

Incidentally, in the above, the display of the instrument cluster display 1 is stopped in the display mode for the heads-up display, but, for example, as illustrated in FIG. 6A, while in the display mode for the heads-up display, content the user is unlikely to continue viewing may be displayed on the instrument cluster display 1. FIG. 6A illustrates a state in which the vehicle speed and the engine speed of the automobile are displayed on the instrument cluster display 1 in the display mode for the heads-up display as content the user is unlikely to continue viewing.

Figure 6B:
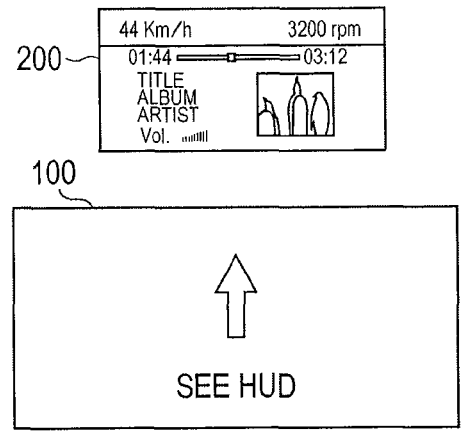

Alternatively, in the display mode for the heads-up display, a message for urging utilization of the heads up cluster display 2 may be displayed on the instrument cluster display 1 as illustrated in FIG. 6B.

Figure 6C:
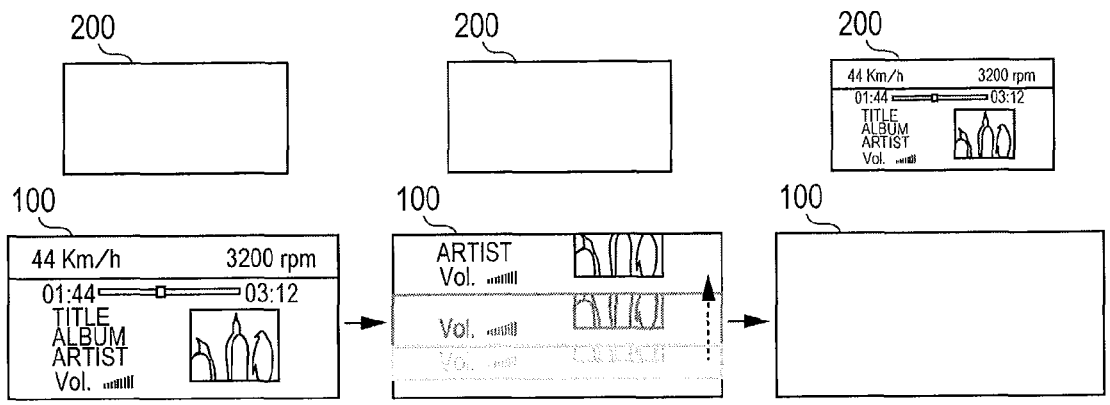
Figure 6D:
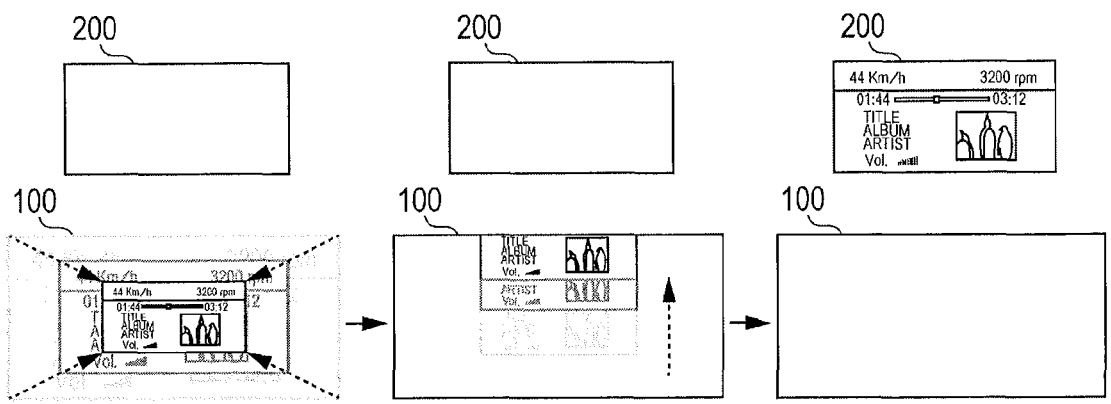

Also, at the time of switching the GUI mode from the instrument cluster display mode to the display mode for the heads-up display, as illustrated in FIG. 6C, an animation in which the display contents of the instrument cluster display 1 move out of the display screen of the instrument cluster display 1 in a direction toward the image projection area 21 of the heads-up display 2 illustrated in FIG. 1C may be displayed on the instrument cluster display 1, and a shift of the viewing point of the user may be urged to the display screen of the heads-up display 2. In addition, as illustrated in FIG. 6D, while the size of the display contents of the instrument cluster display 1 is reduced, the animation in which the display contents of the instrument cluster display 1 move out of the display screen of the instrument cluster display 1 in the direction toward the image projection area 21 of the heads-up display 2 may be displayed on the instrument cluster display 1.

Exemplary embodiments of the present invention have been described above.

It should be noted that, instead of the instrument cluster display 1 arranged in the instrument cluster, a display arranged in a center cluster of the dashboard panel (so-called in-dash display, or the like) may be used.

As described above, if the user who is the driver continues viewing the instrument cluster display 1 for the predetermined period of time, the display of the instrument cluster is stopped, and it is possible to reduce the disturbance in driving caused by the user viewing the instrument cluster display 1 for a long period of time. On the other hand, when the display of the instrument cluster display 1 is stopped, providing the GUI using the display of the heads-up display 2 that displays the images through projection to a position in front of the driver on the front window is started. At this time, in the display of the heads-up display 2, since the image is generally displayed in a translucent manner, this configuration does not significantly disrupt the driver's check of the surrounding area to the front side of the automobile. Therefore, the information presentation to the user can be carried out continuously in a manner that viewing the display does not disturb driving.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An in-vehicle system mounted in a vehicle, the in-vehicle system comprising:
   a first display arranged in the vehicle;
   a second display configured to display an image through a projection to a driver front side position on a front window of the vehicle;
   a viewing point detection unit configured to detect a viewing point of a driver of the vehicle; and
   a user interface control unit configured to provide a user interface using a display on the first display,
   wherein while the vehicle is in motion, if a period of time in which the viewing point of the driver which is detected by the viewing point detection unit is located at a position on a display screen of the first display continues for a predetermined period of time or longer when the user interface is displayed on the first display, the user interface control unit stops the display on the first display and starts to provide a user interface using a display on the second display instead of on the first display.

2. The in-vehicle system according to claim 1,
wherein when the user interface using the display on the second display is started, the user interface control unit displays, on the second display, a display screen identical to a display screen displayed on the first display before the display on the first display is stopped.

3. The in-vehicle system according to claim 1,
wherein when the user interface using the display on the second display is started, the user interface control unit displays, on the second display, information displayed on the first display before the display on the first display is stopped in a manner different from a mode of display of the information on the first display.

4. The in-vehicle system according to claim 1,
wherein when the user interface using the display on the second display is started, the user interface control unit displays, on the second display, only a part of contents displayed on the first display before the display on the first display is stopped.

5. The in-vehicle system according to claim 4,
wherein when the user interface using the display on the second display is started, the user interface control unit displays information, displayed in a first display mode on the first display before the display on the first display is stopped, on the second display in a second display mode that is simplified from the first display mode.

6. The in-vehicle system according to claim 4,
wherein when the user interface using the display on the second display is started, the user interface control unit displays, on the second display, contents displayed at a position within the display screen of the first display where the viewing point of the driver is located immediately before the display on the first display is stopped.

7. The in-vehicle system according to claim 4,
wherein when the user interface using the display on the second display is started, the user interface control unit displays, on the second display, information a content of which is changed last among information displayed on the first display before the display on the first display is stopped.

8. The in-vehicle system according to claim 4, further comprising an input apparatus configured to accept operations by the driver on display objects displayed on the first display and display objects displayed on the second display,
wherein when the user interface using the display on the second display is started, the user interface control unit displays, on the second display, a display object for which the acceptance of an operation was last carried out by the input apparatus before the display on the first display is stopped.

9. The in-vehicle system according to claim 4, further comprising an input apparatus configured to accept operations by the driver on display objects displayed on the first display and display objects displayed on the second display,
wherein when the user interface using the display on the second display is started, the user interface control unit displays, on the second display, a display object for which the acceptance of an operation is carried out by the input apparatus from among the display objects displayed on the first display before the display on the first display is stopped.

10. The in-vehicle system according to claim 1,
wherein while the vehicle is in motion, when the user interface using the display on the first display is provided, if a period of time for which the viewing point of the driver, which is detected by the viewing point detection unit at a position on the display screen of the first display, continues for a predetermined period of time or longer, the user interface control unit provides a display on the first display urging utilization of the second display instead of stopping the display on the first display.

11. The in-vehicle system according to claim 1,
wherein the user interface is a user interface of an AV apparatus or navigation apparatus mounted in the vehicle, and
wherein while the vehicle is in motion, when the user interface using the display on the first display is provided, if a period of time for which the viewing point of the driver, which is detected by the viewing point detection unit at a position on the display screen of the first display, continues for a predetermined period of time or longer, the user interface control unit switches the display on the first display to a display of information related to a state of the vehicle instead of stopping the display on the first display.

12. The in-vehicle system according to claim 1,
wherein while the vehicle is in motion, when the user interface using the display on the first display is provided, if a period of time for which the viewing point of the driver, which is detected by the viewing point detection unit at a position on the display screen of the first display, continues for a predetermined period of time or longer, the user interface control unit displays an animation in which a display content of the first display moves in a direction toward an image display position of the second display and stops the display on the first display.

13. The in-vehicle system according to claim 1,
wherein the first display is arranged in an instrument cluster of the vehicle.

14. The in-vehicle system according to claim 1, wherein the first display is arranged in a dashboard of the vehicle.

15. A method of operating an in-vehicle system mounted in a vehicle comprising:
detecting a viewing point of a driver of the vehicle;
providing a user interface using a display on a first display arranged in the vehicle; and
while the vehicle is in motion, if a period of time in which the detected viewing point of the driver is located at a position on a display screen of the first display continues for a predetermined period of time or longer when the user interface is displayed on the first display, stopping the display on the first display and starting to provide a user interface using a display on a second display instead of on the first display, where the second display is configured to display an image through a projection to a driver front side position on a front window of the vehicle.

16. The method according to claim 15, further comprising:
when the user interface using the display on the second display is started, displaying on the second display a display screen identical to a display screen displayed on the first display before the display on the first display is stopped.

17. The method according to claim 15, further comprising:
when the user interface using the display on the second display is started, displaying on the second display only a part of contents displayed on the first display before the display on the first display is stopped.

18. The method according to claim 17, further comprising:
when the user interface using the display on the second display is started, displaying on the second display one of (a) contents displayed at a position within the display screen of the first display where the viewing point of the driver is located immediately before the display on the first display is stopped, and (b) information a content of which is changed last among information displayed on the first display before the display on the first display is stopped.

19. The method according to claim 17, further comprising:
accepting operations by the driver on display objects displayed on the first display and display objects displayed on the second display, and
when the user interface using the display on the second display is started, displaying on the second display a display object for which the acceptance of an operation was last carried out before the display on the first display is stopped.

20. The method according to claim 15, further comprising:
while the vehicle is in motion, when the user interface using the display on the first display is provided, if a period of time for which the viewing point of the driver is located at a position on the display screen of the first display continues for a predetermined period of time or longer, switching the display on the first display to one of (a) a display of information related to a state of the vehicle instead of stopping the display on the first display, and (b) a display utilization of the second display instead of stopping the display on the first display.

* * * * *